Feb. 4, 1930.   H. R. ANDREW   1,745,970
ROAD CLEARING DEVICE
Filed May 11, 1928
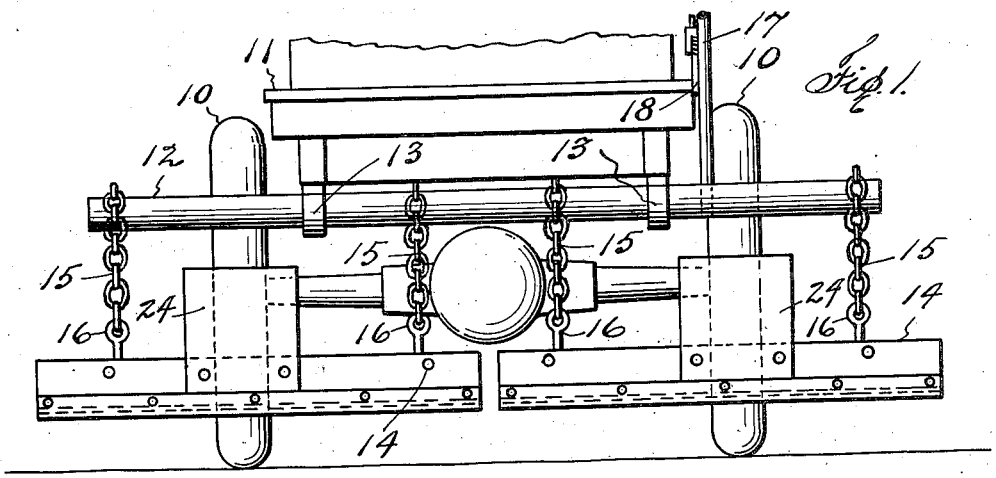
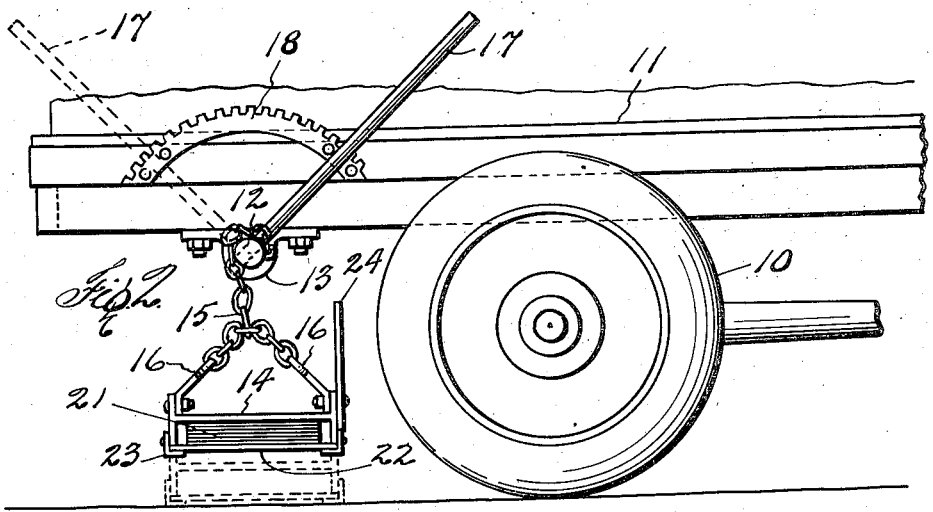
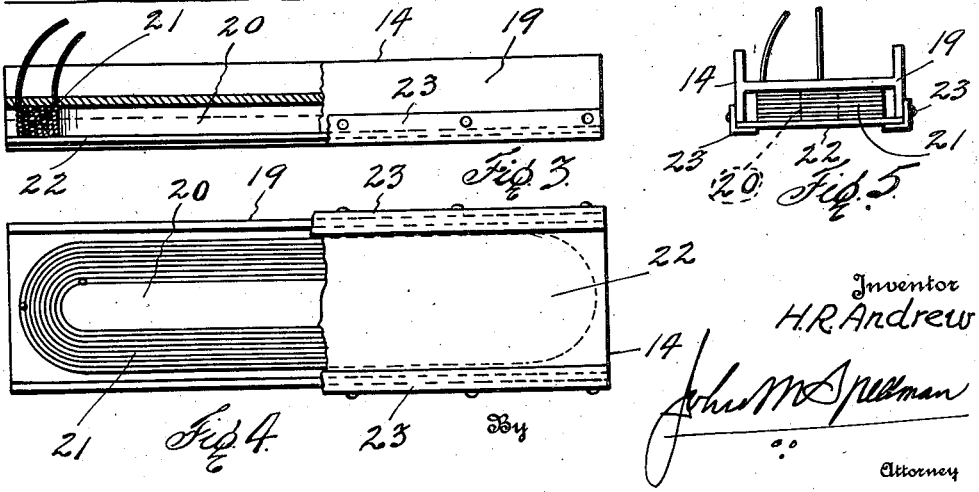
Inventor
H. R. Andrew
By John M. Spellman
Attorney Patented Feb. 4, 1930

1,745,970

UNITED STATES PATENT OFFICE

HARRY R. ANDREW, OF ROSWELL, NEW MEXICO

ROAD-CLEARING DEVICE

Application filed May 11, 1928. Serial No. 277,075.

This invention appertains to new and useful improvements in road clearing devices.

The primary object of the invention is to provide an electro-magnet apparatus to clear from the paths of the wheels of vehicles, particularly when the wheels are equipped with pneumatic tires, nails, tacks, small pieces of metals and the like, and to some degree other small objects, which are capable of puncturing or otherwise injuring the tires.

Another object of the invention is to provide a device embodying the aforementioned features, together with means for transporting the same in a convenient and effective manner, preferably on a motor actuated vehicle such as a truck or the like.

A further object of the invention is to provide a device that will be of simple and durable structure and yet be of nominal cost and maximum results for the purposes intended.

A still further object of the invention is to provide a device of the character mentioned on which a separate power unit is mounted thereby maintaining a uniform current, irrespective of the speed of the motor of the vehicle.

A construction designed to carry out the invention will be hereinafter described together with other features of the invention.

The invention will be more readily understood from a reading of the following specification and by reference to the accompanying drawings, in which an example of the invention is shown, and wherein:

Figure 1 is a rear view of a popular make of truck to which my road clearing device is attached in accordance with my invention, Figure 2 is a side view of the device showing the rear portion of a truck, Figure 3 is a side view of the electro-magnet, portions being broken away, Figure 4 is a plan view of the same, and Figure 5 is an end view.

Employing like characters of reference for corresponding parts throughout, the numeral 10 designates the rear wheels of a motor vehicle 11. The details of structure are considered of no significance as the invention may be applied to any suitable vehicle.

At the underneath rear portion of the frame of the vehicle is loosely journaled a transverse bar 12 in bearings 13 which are secured to the body of truck. Two electro-magnets 14 are suspended from the bar 12 by means of chains 15. The chains are connected to the electro-magnets by means of eye-bolts 16 at one end, and to the bar 12 at the other. However, it is apparent that other means for suspension other than chains may be used. For raising and lowering the electro-magnets as each particular case may necessitate, a lever 17 is fastened to bar 12 at one side of the vehicle and is engaged with a notched segment 18 secured to the side of the body of the vehicle. It is obvious that the electro-magnets may hang nearer the road when the same is smooth but on a pavement of irregularities and indentations the magnets will have to swing higher from the road.

The electro-magnet 14 is composed of an I beam 19 to the center web of which is attached a magnet core 20. This magnet core is wound with suitable wire 21 and is magnetized by current supplied from a generator (not shown) mounted on the truck. A brass plate 22 is bridged across the flanges of the I-beam, and over the magnet core. Angle strips 23 may be used as retaining means for the plate 22 or any suitable means. Such objects as are attracted by the magnet will be held to this plate and instantly released when the circuit of the coil is broken, on account of the brass surface to which they are attached. Mud guards 24 may be fastened to the side of the electro-magnet to prevent the splashing of mud and the like on the magnets.

In practice one man can easily operate the machine. The operator drives the truck along one side of the road at a comparatively slow speed. The length of the two electro-magnets are substantially one-half the width of an ordinary road. It is obvious of course that the length of the magnets may vary according to the condition. When a predetermined length of road has been traveled the truck then returns on the opposite side of the road. For dumping the scrap iron and etc., a piece of canvas or the like is spread underneath the magnets. When the current is cut off the accumulated scraps drop on the canvas to be suitably disposed of.

Various changes in the size and shape of the different parts, as well as modifications and alterations may be made within the scope of the appended claim.

Having now described this invention and explained the mode of its operation, what I claim is:—

In apparatus of the character described, the combination with a truck frame mounted on front and rear wheels, of a rod journaled in bearings secured to the under side of said frame behind said rear wheels, a plurality of chains having their upper ends secured to the periphery of said rod, a plurality of electromagnets secured to the lower ends of said chains, a manually operable lever having its lower end secured to said rod for rotation of said rod to raise and lower said electromagnet, and a notched segment secured to said frame for cooperating with said lever to hold said lever and said electro-magnets in adjusted position.

In testimony whereof I affix my signature.

HARRY R. ANDREW.